April 2, 1968     EIICHI ISHIGAKI     3,375,932

CONTINUOUS FILTRATION DEVICE OF THE PRESSURE TYPE

Filed March 21, 1966     2 Sheets-Sheet 1

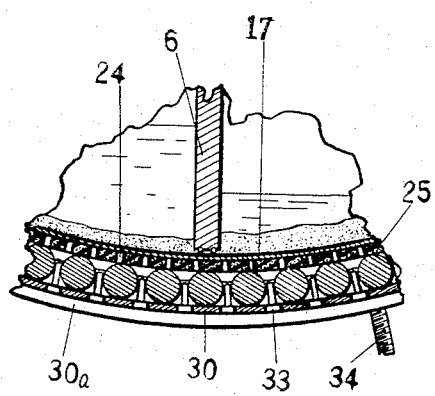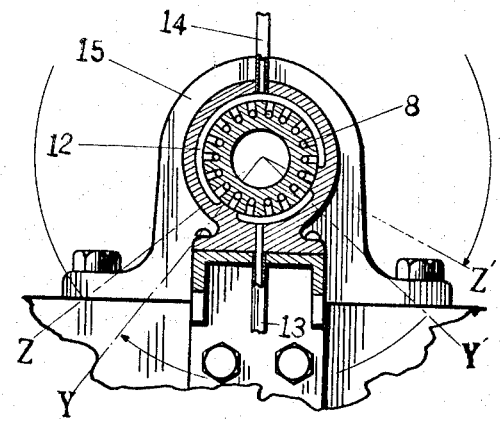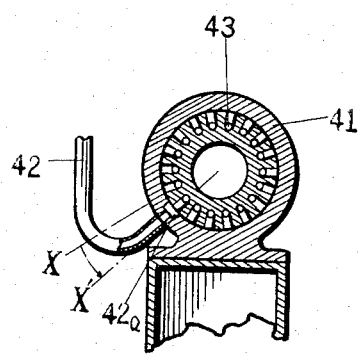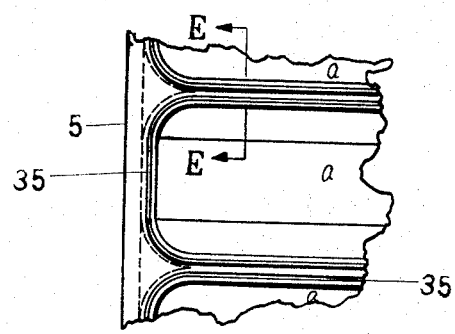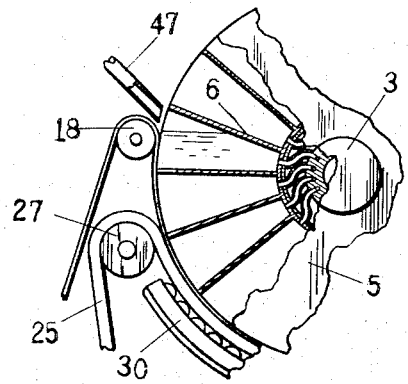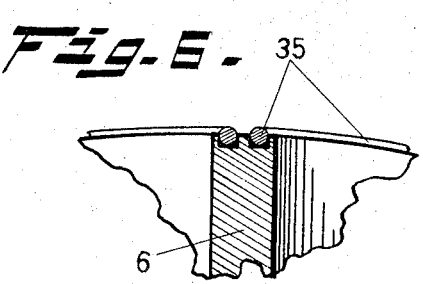

United States Patent Office 3,375,932
Patented Apr. 2, 1968

3,375,932
CONTINUOUS FILTRATION DEVICE OF THE PRESSURE TYPE
Eiichi Ishigaki, Kagawa Prefecture, Japan, assignor to Ishigaki Kiko Co., Ltd., Sakaide, Kagawa Prefecture, Japan
Filed Mar. 21, 1966, Ser. No. 536,072
2 Claims. (Cl. 210—390)

ABSTRACT OF THE DISCLOSURE

A continuous filtration device of the pressure type, comprising a machine frame, a revolving drum rotatably mounted on said machine frame, said drum having a plurality of pressure chambers arranged radially with respect to the axis of the drum and opening radially out of said drum, two series of rollers rotatably mounted on said machine frame, an endless filter cloth extending over one of said series of rollers and guided along and against a portion of the circumferential wall of the drum and covering the open ends of the radial chambers, a porous endless belt extending over the other series of rollers and guided along and in contact with said filter cloth and along said portion of the circumferential wall of the drum, liquid feed means coupled to said drum and feeding a liquid material to said pressure chambers, and means coupled to said drum supplying compressed gas to said pressure chambers.

---

This invention relates to a continuous filtration device of the pressure type comprising a revolving drum pivotally mounted on a machine frame, said revolving drum being provided with a multiplicity of pressure chambers arranged radially with respect to the axis of the drum, two series of rollers rotatably mounted on said machine frame, an endless filter cloth passed over one of said series of rollers, and a porous endless belt passed over the other series of rollers, portions of said filter cloth and porous endless belt being guided, in overlapping relation, against a portion of the circumferential wall of said revolving drum, said drum being provided with a device adapted to feed a liquid material to said pressure chambers, the open ends of which are blocked by said filter cloth as the drum is driven and with a device adapted to supply compressed air or gas to said pressure chambers. While conventional filters of the continuous type, e.g. revolving-cylinder vacuum filters, are suited for removal of sediments, the pressure difference utilized by such vacuum type equipment is merely the difference between atmospheric pressure and the vapor pressure of the liquid. Therefore, due to this small pressure difference, operation of vacuum type filters is usually accompanied by various troubles, which limit their general use.

In contrast, when a filtering device is a pressure type, the above-mentioned troubles are eliminated and the maximum possible filtration pressure and speed may be attained. None of the conventional filtration devices of the pressure type, however, has structural advantages comparable to those of the revolving-cylinder vacuum filtration device which is capable of continuous filtration. Thus, although a few machines which may be relegated to the group of continuous pressure filters, as well as reversible filters, are known as filters of the pressure type in addition to the more ordinary pressure filters and pressure type laminar filters, these conventional filters depend on a common operating principle which consists of alternate cycles of a process of supplying a liquid material and filtering the same and "a process of suspending the supply of the liquid, discharging the sediment, and cleaning the inside of the device," despite the term "continuous" invariably attached to such machines. Even in the case of the reversible filter which is generally acknowledged to be one of the latest and most advanced filtering machines, the filtration process involved is still intermittent. Furthermore, in order to obtain dry sediments with those conventional continuous pressure filters, it is imperative to suspend the supply of the material liquid fed to the filter element before the sediments are removed. Stated differently, it has been quite impossible to obtain dry sediments continuously from any of the conventional pressure filters.

The present invention has as its object to provide a continuous pressure filtration device which not only makes a truly continuous pressure filtration process possible by ameliorating or eliminating the above-mentioned disadvantages of conventional filters of the continuous pressure type, but also makes it possible to obtain dry sediments continuously just as is possible with a vacuum filter of the revolving cylinder type.

This invention will hereinafter be described in detail, reference being had to the accompanying drawings, in which:

FIG. 2(a) is a view showing, on an enlarged scale, a part of the cross-section illustrated in FIGURE 2;

FIG. 3 is a sectional view taken along the line C—C of FIGURE 1;

FIG. 4 is a sectional view taken along the line D—D of FIGURE 1;

FIG. 5 is a plan view showing, on an enlarged scale, one end of a revolving drum used in said device;

FIG. 6 is a further enlarged cross-sectional view taken along the line E—E of FIGURE 5; and FIG. 7 is a partial side-elevation view showing another embodiment of the invention, similar to FIGURE 2.

Figure 1:
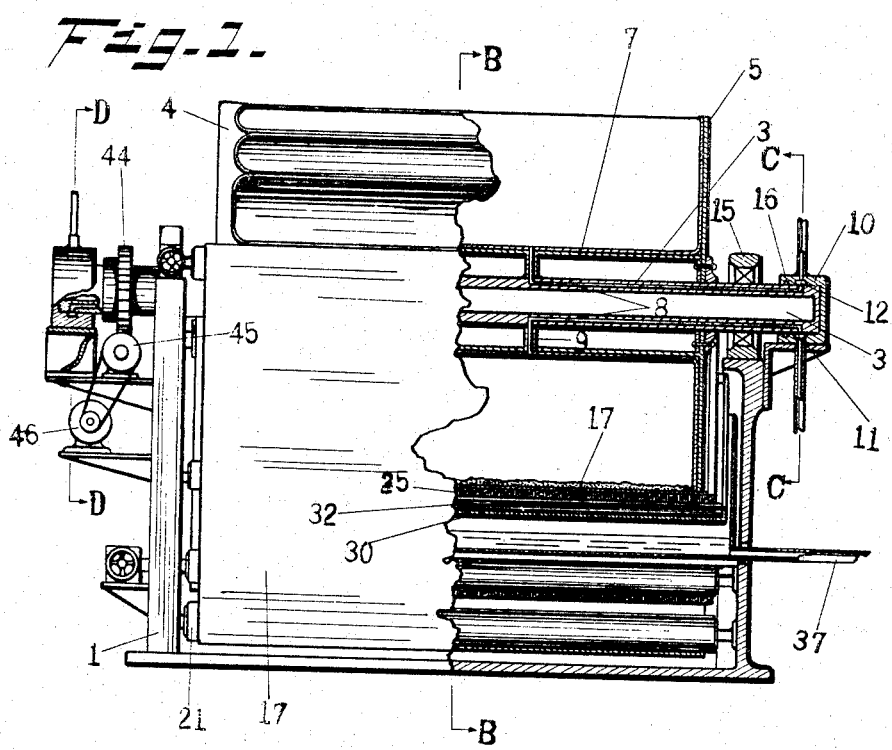
FIG. 1 is a front view of a continuous pressure filtration device embodying the principles of the invention, with a portion thereof being represented in section along the line A—A of FIGURE 2.

Referring, now, to FIGURE 1, a machine frame 1 has a revolving drum 2 mounted on a hollow revolving shaft 3 provided across said frame 1. The revolving drum 2 has a circumferential wall 4 on which a multiplicity of pressure chambers $a$ are provided in radial relation with respect to the center of the drum, said pressure chambers being respectively shaped like pockets with the radially outer sides open. The pressure chambers $a$ are also pressure-resistant, being in the form of pocket-like sections defined by a cylindrical bottom plate 7 and partitioning walls 6 extending radially through spaces defined by and between side walls 5.

The revolving shaft 3 of the drum 2 is provided with a plurality of orifices 8 along its axis of revolution, said orifices communicating, at one end, with said pressure chambers $a$ through pipes 9 respectively, with the other ends of said orifices 8 having selective access to a compressed air source and the atmosphere through an automatic change-over valve, said selective access being attainable by changing the rotational position of the drum.

In FIGURE 1 which illustrates one example of this mechanism, a housing 10 is rotatably mounted on the ends of said revolving shaft 3, and as shown in FIGURES 1 and 3, the inner circumferential wall of said housing 10 is provided with arcuate channels 11 and 12. The other ends of said orifices 8 communicate with said arcuate channels 11 and 12.

The arcuate channel 11 is at all times in communication with said compressed air source (not shown) through a pipe 13, while the arcuate channel 12 communicates with the atmosphere through a pipe 14. In this arrangement, as the revolving drum 2 is driven, said orifices 8 at one end, come into communication with said arcuate channels 11 and 12 for a predetermined rotational distance.

Indicated by numeral 15 is a bearing for the revolving shaft 3, and 16 is an O-ring. An endless filter cloth 17 is wrapped around substantially the lower half-portion of the revolving drum 2 and is passed over a winding roller 18 located adjacently to the revolving drum 2, a roller 19 installed so that the distance between the roller 19 and the drum 2 is adjustable, a sediment elimination roller 20, guide rollers 21, 21', a crease-eliminating roller 22, and a deviation adjusting roller 23. A porous endless belt 25 having perforations or orifices 24 is overlapped with the portion, where said filter cloth 17 is wrapped around the inner circumferential wall 12a, of said revolving drum, said endless belt 25 consisting of a hard rubber plate and a metal plate laminated therewith, in such a manner that the filter cloth 17 is positively held in intimate contact with the circumferential wall 4a of the revolving drum 2 by said porous endless belt 25. Thus, the porous endless belt 25 is passed over rollers 26, 27, 28, and 29. The rollers 26, 27 and 28 are pivotally mounted on the machine frame 1, while the roller 29 can have the necessary tension applied to said porous endless belt 25 by adjusting a bearing 29b carrying the revolving shaft 29a.

The same porous endless belt 25 is also pressed against the circumferential wall 4 of said revolving drum by another pressing device. Thus, a roller receiving plate 30 has a surface corresponding with the curvature of the circumferential wall of a cylinder. Arranged in parallel on said roller receiving plates is a multiplicity of rollers 32, 32.

Provided, further, with a multiplicity of orifices 33, the roller receiving plate 30 is also disposed so that when it is pushed by the forward ends of push screws 34, which are threaded onto part of the machine frame 1, toward the circumferential wall 4 of the revolving drum, the porous endless belt 25 is pressed toward the circumferential wall 4 of the drum 2 through the rollers 32, and the filter cloth 17 is pressed against the open end edges of the pressure chambers a, whereby the openings of said pressure chambers a, are covered.

Indicated by numeral 30a is a rib formed under the roller receiving plate.

The portions of the circumferential wall 4 of the revolving drum 2 which correspond with the open end edges of said pressure chambers a, are provided with O-rings 35, as shown in FIGURES 5 and 6, so that the rails between said filter cloth and the open end edges of said pressure chambers a, are held secure and positive at all times by said O-rings 35. Indicated by numeral 36 is a filtrate receiving tank, 37 is a pipe for withdrawing the filtrate, 38 is a washing water pipe provided with a nozzle 38a, 39 is a washing water tank, and 40 is a scraping blade adapted to remove the sediment.

The mechanism for supplying the liquid material in this particular mode of embodiment will now be described.

Referring to FIGURES 1 and 4, 41 is another housing into which the other end of said revolving shaft is rotatably fitted and, in a suitable position on the inner peripheral surface of said housing 41, there is provided an automatic changeover valve mechanism into which the forward end of a material liquid supply pipe 42 discharges at 42a. The revolving shaft 3 is provided with orifices 43, which communicate with said pressure chambers a, said orifices resembling those formed in the compressed air supply mechanism hereinbefore described. As the revolving shaft 3 is driven, one end of each orifice 43 comes temporarily into communication with the opening 42a of the inner peripheral wall of said housing 41 at the forward end of the material liquid supply pipe 42 so that with the revolving of the shaft 3, each pressure chamber a is supplied with the material liquid automatically as the former is brought into a certain rotational position.

In FIGURE 1, 44 is a worm wheel fitted over said revolving shaft, and 45 is a shaft fitted with a worm gear (not shown) in mesh with said worm wheel 44, said shaft 45 being driven by a motor 46 provided with a built-in speed reducer.

Figure 2:
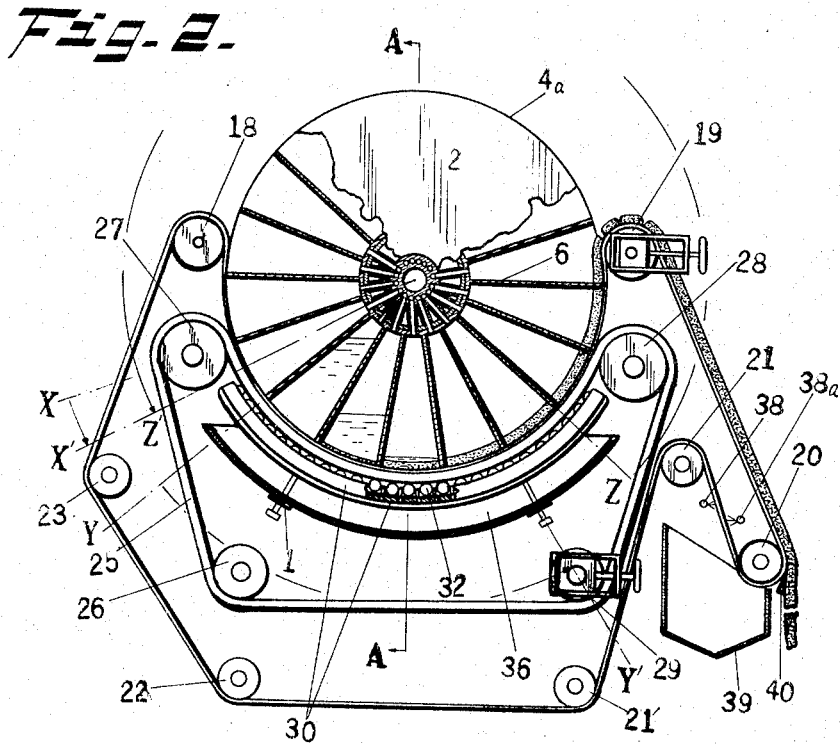
FIG. 2 is a side-elevation view of said device, with the frame structure thereof being removed, a portion of said device being represented in longitudinal section along the line B—B of FIGURE 1.

The filtration device of this invention is operated in the following manner. By driving the revolving drum 2 in the direction of the arrow a, the material liquid is fed from the material liquid supply pipe 42 to the pressure chambers a, successively coming into the predetermined rotational position through the orifices 43. It is to be noticed, however, that the material liquid is supplied only after the open end of each pressure chamber a is blocked by the filter cloth 17 and porous endless belt 25 thereover, that is to say, while the center of the pressure chamber a lies within the rotational section X–X' in FIGURE 2. And each pressure chamber a is supplied with compressed air through orifice 8 while the center of the chamber lies within the rotational segment Y—Y. Thus, one end (the open end within the housing 10) of each orifice 8 communicating with each pressure chamber a communicates with the arcuate channel 11 discharging into the compressed air supply pipe 13 while the pressure chamber a lies within the above-mentioned rotational segment. Therefore, during the time in which each pressure chamber a travels over the first half of the pressure segment Y–Y', the material liquid introduced into the pressure chamber a is compressed and filtered and the filtrate drips down into a filtrate receptacle or tank 36 through the orifices 24, formed in said porous endless belt 25, the clearances among rollers 32 and the orifices 33, in the roller receiving plate 30, while the sediment adhering to the filter cloth 17 is dehydrated and dried while the second half of the pressure segment Y–Y' is traversed by the pressure chamber a, and finally carried away, still on the filter cloth, from the pressure chamber a to be ultimately scraped off the cloth by a scraper 40 on the peripheral surface of sediment elimination roller 20.

The filter cloth 17 from which the sediment has been removed is washed with jets of water from a nozzle on a cleaning water pipe 38, said nozzle consisting of small orifices formed in said cleaning pipe 38. The filter cloth is then passed over the guide roller 21, crease elimination roller 22, deviation adjusting roller 23 and winding roller 18 to be finally wound again around the lower circumferential wall of the revolving drum 2.

Referring to FIGURE 7 which illustrates another example of the liquid material supply device, it will be noticed that whereas, in the preceding example, the liquid material is supplied through the orifices 43 within the revolving shaft 3, the forward end of a liquid material supply pipe 47 is located just above the winding roller 18 as shown in FIGURE 7 to discharge directly into the open end of the pressure chamber a. In this particular embodiment, it is to be noted that in the rotational segment Z–Z' after each pressure chamber a travels over the above-mentioned pressure segment Y–Y', the ends of the orifices 8 formed in said pressure chambers a successively come into communication with the atmosphere through the arcuate channel 12. Thus, at the time immediately following the detachment of said filter cloth 17 from the above-mentioned overlapping position with respect to said porous endless belt 25, the dehydrated sediment on the filter cloth 17 is prevented from being forced out and carried away by any residual compressed air in the pressure chamber a.

The two liquid supply devices described hereinbefore may be concurrently employed so long as, in point of function, they do not conflict each other. For example, in a liquid material supply system established in the position illustrated by FIGURE 7, if a second liquid supply device involving the passage through the orifice within the revolving shafts 3 is additionally provided, the latter device may be utilized as a system for the supply of cleaning fluid and the above-mentioned pressure segment is divided into two sections, between which a cleaning fluid supply segment is provided, whereby after the liquid material supplied through the liquid material supply pipe 47 is filtered under pressure in the first pressure section, the sediment is washed in the following cleaning fluid supply segment and, then, filtered under pressure a second time in the second pressure section.

The continuous filtration device embodying the principles of this invention has the mechanism illustrated and described by the above-mentioned examples. With this device, filtration is automatically and continuously carried out without interruptions. Stated differently, the filtration device of the present invention is free from the disadvantages of conventional pressure filters in which the sediments must be removed and the machines cleaned by suspending the charging of the material liquid, that is to say, by suspending the filtration operation. This not only makes it possible to attain the maximum possible filtration speed, but also eliminates the need for controls designed to effect the intermittent operation automatically. In addition, being a pressure-type machine, the filtration device of the invention provides a rather high filtration pressure as compared with the vacuum-type machine, yet there is trouble encountered in the latter. In spite of being a pressure system, the removal of dehydrated and dried sediment may be easily carried out without suspending the filtration operation for that purpose as is necessary for the conventional pressure-type filtration machine. A dry sediment is obtained efficiently and continuously just as is the case with a vacuum filter of the revolving cylinder type.

What I claim is:

1. A continuous filtration device of the pressure type, comprising a machine frame, a revolving drum rotatably mounted on said machine frame, said drum having a plurality of pressure chambers arranged radially with respect to the axis of the drum and opening radially out of said drum, two series of rollers rotatably mounted on said machine frame, an endless filter cloth extending over one of said series of rollers and guided along and against a portion of the circumferential wall of the drum and covering the open ends of the radial chambers, a porous endless belt extending over the other series of rollers and guided against said filter cloth and along said portion of the circumferential wall of the drum, liquid feed means coupled to said drum and feeding a liquid material to said pressure chambers, means coupled to said drum supplying compressed gas to said pressure chambers, and a roller receiving plate having a plurality of rollers thereon positioned side by side with their axes parallel and at predetermined spacings, said roller receiving plate extending along said portion of said circumferential wall of said drum and forcing said porous endless belt at all times toward the circumferential wall of the revolving drum.

2. A continuous filtration device of the pressure type, comprising a machine frame, a revolving drum rotatably mounted on said machine frame, said drum having a plurality of pressure chambers arranged radially with respect to the axis of the drum and opening radially out of said drum, two series of rollers rotatably mounted on said machine frame, an endless filter cloth extending over one of said series of rollers and guided along and against a portion of the circumferential wall of the drum and covering the open ends of the radial chambers, a porous endless belt extending over the other series of rollers and guided against said filter cloth and along said portion of the circumferential wall of the drum, liquid feed means coupled to said drum and feeding a liquid material to said pressure chambers, means coupled to said drum supplying compressed gas to said pressure chambers, the drum having a plurality of orifices therein extending in the direction of the axis of rotation of said drum and opening at one end into the respective pressure chambers, and said liquid feed means comprising a liquid material supply pipe connected to the other end of said orifices, and an automatic change-over valve mechanism between the ends of said orifices and said supply pipe for successively connecting said orifices to said supply pipe.

References Cited

UNITED STATES PATENTS

| | | | |
|---|---|---|---|
| 82,735 | 10/1868 | Merrill | 210—386 |
| 877,631 | 1/1908 | Clark | 210—391 |
| 2,197,610 | 4/1940 | Fedeler | 210—401 X |
| 3,254,768 | 6/1966 | Shimizu | 210—386 X |
| 3,273,494 | 9/1966 | Cocchiarella | 210—386 X |

REUBEN FRIEDMAN, *Primary Examiner.*

J. ADEE, *Assistant Examiner.*